United States Patent [19]  [11] Patent Number: 4,511,424
Usui  [45] Date of Patent: Apr. 16, 1985

[54] APPARATUS FOR PRODUCING SHEET MOLDING COMPOUND

[76] Inventor: Fumio Usui, 441 Shimoasao, Asao-ku, Kawasaki-shi, Kanagawa, 215, Japan

[21] Appl. No.: 456,089
[22] PCT Filed: May 28, 1982
[86] PCT No.: PCT/JP82/00204
 § 371 Date: Dec. 29, 1982
 § 102(e) Date: Dec. 29, 1982
[87] PCT Pub. No.: WO82/04219
 PCT Pub. Date: Dec. 9, 1982

[30] Foreign Application Priority Data
May 30, 1981 [JP] Japan .................................. 56-83119

[51] Int. Cl.$^3$ ........................................... B65H 81/00
[52] U.S. Cl. .................... 156/426; 118/405; 156/174; 156/428
[58] Field of Search ............... 156/172, 173, 174, 175, 156/425, 426, 271, 428, 430, 431, 432; 118/405, 410

[56] References Cited
U.S. PATENT DOCUMENTS

| 3,282,757 | 11/1966 | Brussee | 156/172 |
| 3,616,072 | 10/1971 | Bostrum | 156/244 B |
| 4,251,036 | 2/1981 | McLain | 156/425 |
| 4,265,691 | 5/1981 | Usui | 156/174 |
| 4,295,917 | 10/1981 | Stinnes | 156/244 B |

FOREIGN PATENT DOCUMENTS
2016543 9/1979 United Kingdom .

Primary Examiner—Michael Ball
Attorney, Agent, or Firm—Wenderoth, Lind & Ponack

[57] ABSTRACT

A nozzle structure for supplying synthetic resin to a core of a sheet molding apparatus for molding a sheet molding compound. The nozzle structure has a hollow annular nozzle with an opening directed generally along or at an angle to the core on which the sheet is being molded, and frustoconical members are provided for guiding linear materials through the nozzle structure for coating them with synthetic resin.

5 Claims, 33 Drawing Figures

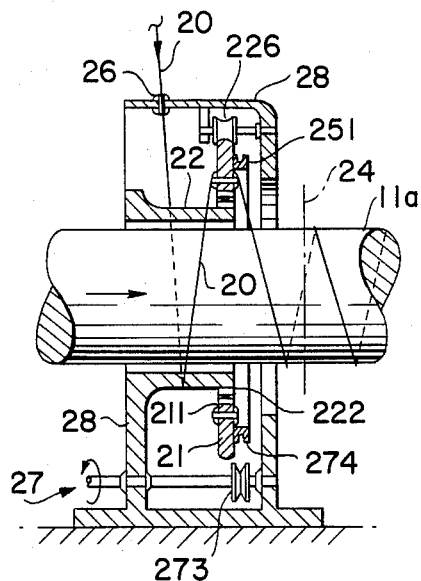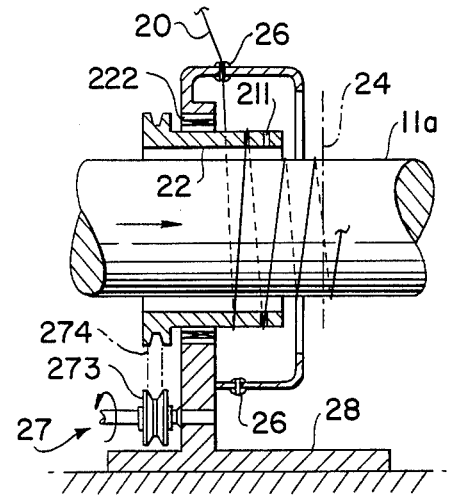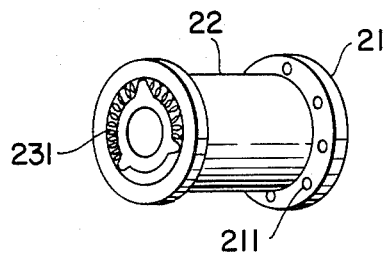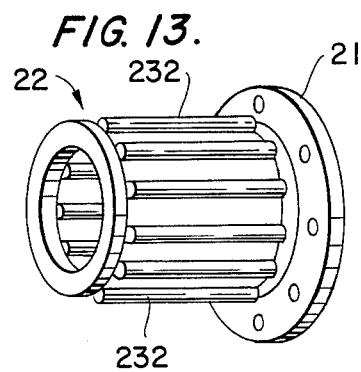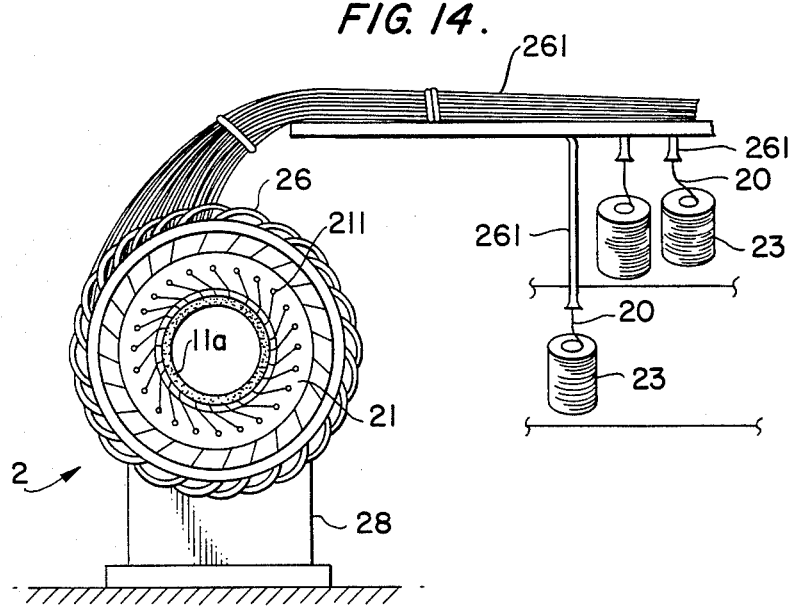

APPARATUS FOR PRODUCING SHEET MOLDING COMPOUND

DESCRIPTION

1. Technical Field

The present invention relates to a method and an apparatus for producing a sheet molding compound.

2. Background Art

The term "linear material" as used herein and in the appended claims is to be understood to mean any such materials as vegetable fiber, animal fiber, mineral fiber, synthetic fiber, metal wire, and the like.

Glass fiber sheet used heretofore was a textile fabric in which warps and wefts were crossed and interwoven together as in a common textile fabric. In such woven glass fiber sheet, however, there was a tendency that the threads bent at intersections broke easily, resulting in a disadvantageous decrease in the strength of the sheet as a whole. In general, a sheet used as a reinforcing material of a product of a reinforced synthetic resin is preferably not a woven sheet but an unwoven sheet in which warps and wefts are laid on each other in a lattice shape. In producing a long belt-like sheet in this way, however, arrangement of wefts was difficult and inefficient. Accordingly, continuous production of such sheet was impossible, and multi-layer arrangement of warps and wefts was difficult.

Therefore, the present applicant previously proposed methods and apparatuses for continuous production of a sheet, in which glass fibers were not woven but were only laid on each other (Japanese Patent Public Disclosures Nos. 114979/78 and 125772/79). These inventions included an indispensable step of winding a glass fiber as a weft. In the heretofore employed winding processes including the step employed in these inventions, a linear material was wound around a core bar either by rotating the core bar while holding a bobbin on which the linear material was wound in a fixed position or by moving the bobbin about the core bar which was fixed. However, the conventional winding processes had serious disadvantages such that:

(1) It was difficult to enlarge the equipment because either the bobbin or the core bar had to be rotated or moved about;

(2) A continuous operation over a long time was difficult because exchange of the reel and extension of the core bar were necessary;

(3) It was difficult to wind a number of linear materials simultaneously; and (4) Since the rotating and moving means was relatively complicated in construction and large in size, it was difficult to add thereto apparatuses to perform other working processes simultaneously.

DISCLOSURE OF THE INVENTION

Accordingly, an object of the present invention is to provide a method and an apparatus for producing a sheet molding compound without weaving linear materials, which are simple and economical and yet are capable of obviating disadvantages of the conventional winding processes.

The method according to the present invention comprises the steps of circulating a flat belt, changing the shape of the flat belt in the intermediate portion thereof into a cylindrical form, guiding a carrier film and warp linear materials longitudinally of the cylindrically formed portion, winding a weft linear material thereon, supplying synthetic resin, cutting open the cylindrically formed body comprising the warp linear materials and the weft linear material longitudinally into a belt-like sheet, and winding up the belt-like sheet. The method according to the present invention is characterized in that the flat belt is changed in shape at the intermediate portion thereof into the cylindrical form and the weft linear material is wound thereabout.

BRIEF DESCRIPTION OF THE DRAWINGS

FIG. 10 is a sectional view similar to FIG. 6, showing a further embodiment;

FIG. 11 is a sectional view similar to FIG. 6, showing a still further embodiment;

FIGS. 12 and 13 are perspective views showing other embodiments of the winding disk and the winding drum;

FIG. 14 is a side view of the linear materials guiding mechanism;

BEST MODE FOR CARRYING OUT THE INVENTION

Figure 1:
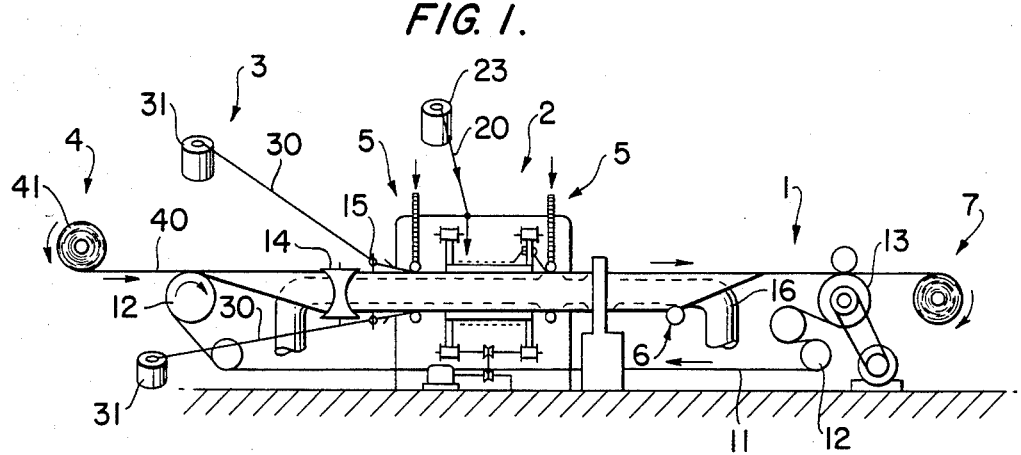
FIG. 1 is a schematic side view showing the construction of the apparatus according to the present invention.

The apparatus according to the present invention will first be described in detail with reference to FIG. 1, in which the apparatus according to the present invention comprises a belt circulator 1, a winder 2, a warp linear material feeder 3, a carrier film feeder 4, a synthetic resin feeder 5, a cutter 6, and a compound winder 7.

Figure 2:
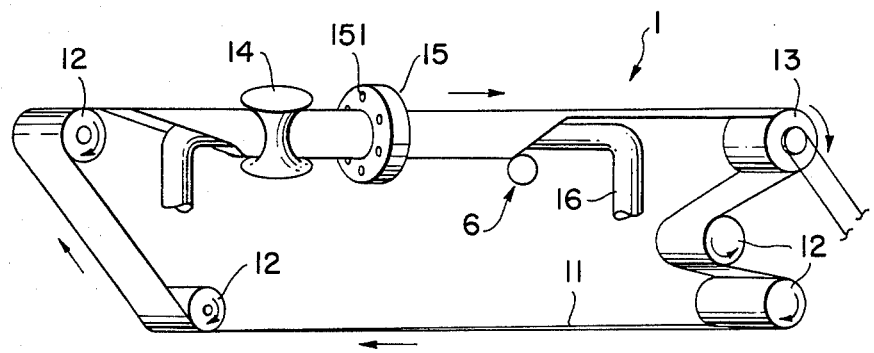
FIG. 2 is a perspective view of the belt circulator.

With reference now to FIGS. 1 and 2, a belt circulating step and the belt circulator 1 will be described. The belt circulator 1 comprises a flat belt 11, guide rollers 12, a driving roller 13, an hourglass roller 14, an annular guide 15, and a core bar 16.

The flat belt 11 is supported by the guide rollers 12 for circulation in a predetermined passage closed path and is driven by the driving roller 13. The flat belt 11 is circulated for the most part in a flat belt-like form as shown in FIG. 2, but only in the part corresponding to the guide of the warp linear material and the weft linear material as will be described hereinafter, it is forced by the hourglass roller 14 and the annular guide 15 to be curved widthwise into a cylindrical shape for passage therethrough. That is, the flat belt 11 is preformed by the hourglass roller 14 into the cylindrical shape and then inserted into the central bore of the annular guide 15 to be formed into the cylindrical shape having the diameter substantially identical to the inner diameter of the central bore of the annular guide 15. A common conveyor belt or a power transmission belt of such material as leather, textile fabric, rubber, steel or the like may be used as the flat belt 11.

The annular guide 15 is provided with a plurality of warp guide bores 151 arranged concentrically about the belt guide hole, whereby linear materials 30 (hereinafter called warp linear materials) payed out from a plurality of warp linear material bobbins 31 are inserted into the warp guide bores 151 respectively, so that the warp linear materials arranged in a cylindrical form along the cylindrical portion of the flat belt 11 are advanced in parallel in the direction of an arrow as shown in FIG. 1.

The core bar 16 extends through the cylindrically formed portion of the flat belt 11 to prevent the belt from deformation while winding the weft linear material as will be described hereinafter. In the case where the flat belt 11 has a sufficient rigidity to resist the winding force, the core bar is not required.

Figure 3:
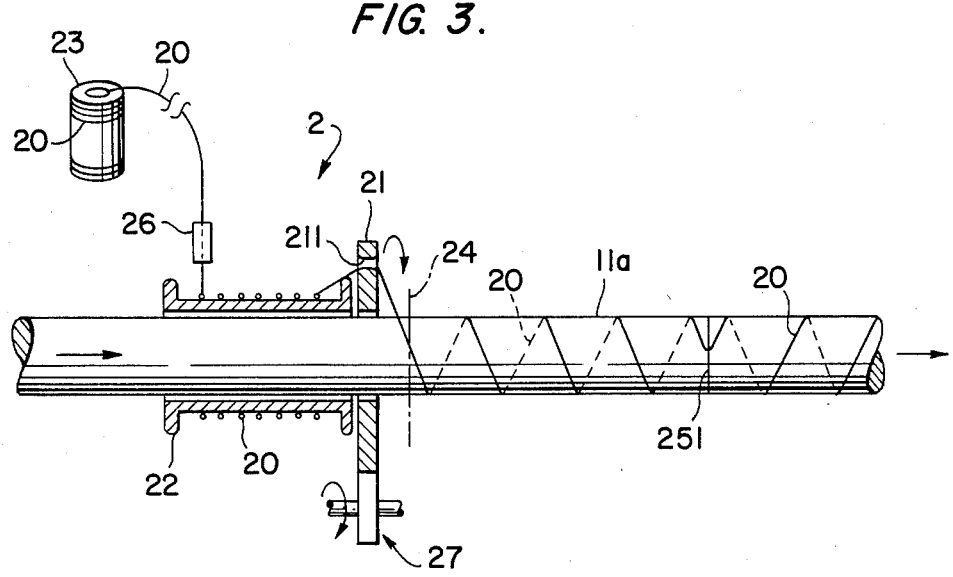
FIG. 3 is a schematic illustration of the principle of the winding method according to the present invention.

Referring now to FIG. 3, the step for winding the linear material intended to be the weft (hereinafter called weft linear material) 20 will be described. Along with the winding step, the step for feeding synthetic resin is performed. For convenience of explanation, however, only the winding step will be described here, and the synthetic resin feeding step will be described hereinafter with reference to FIGS. 16 to 19.

The cylindrically formed portion 11a (hereinafter called the winding core) of the flat belt 11 is inserted coaxially through a winding disk 21 and a winding drum 22, and supported free from contact therewith. The winding core 11a is movable axially thereof and the winding disk 21 is rotatable about the axis of the winding core 11a. The winding disk 21 is provided with at least one guide hole 211 on the outer periphery thereof. A bobbin 23 having the weft linear material 20 wound therearound is located at a predetermined position. A binding position 24 is established at a position downstream of and adjacent to the winding disk 21 with respect to the direction of movement of the winding core 11a.

Figure 4A:
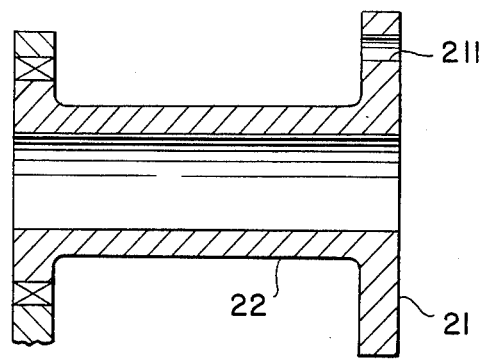
FIGS. 4A to 4C are sectional views showing the relationships between the winding disk and the winding drum.
Figure 4B:
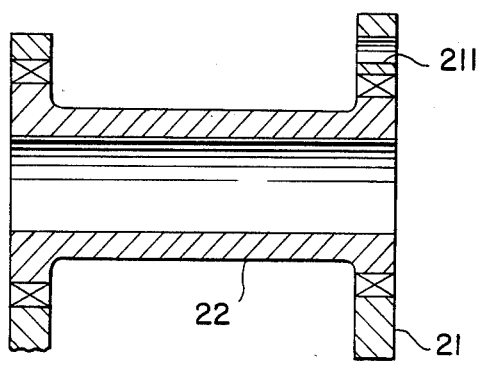
Figure 4C:
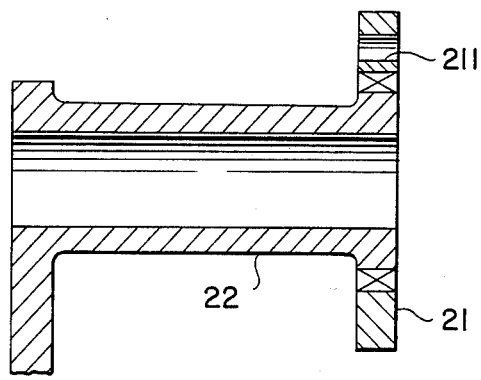

The relationship between the winding disk 21 and the winding drum 22 is as shown in FIGS. 4A to 4C, that is, the winding disk 21 and the winding drum 22 may take any of the three different constructions, in which they are formed integrally (FIG. 4A), they are connected rotatably relative to each other (FIG. 4B), and the winding drum 22 is fixed while the winding disk 21 is supported rotatably therewith (FIG. 4C). The winding drum 22 is positioned upstream of and adjacent to the winding disk 21 with respect to the direction of movement of the winding core 11a.

Figure 5:
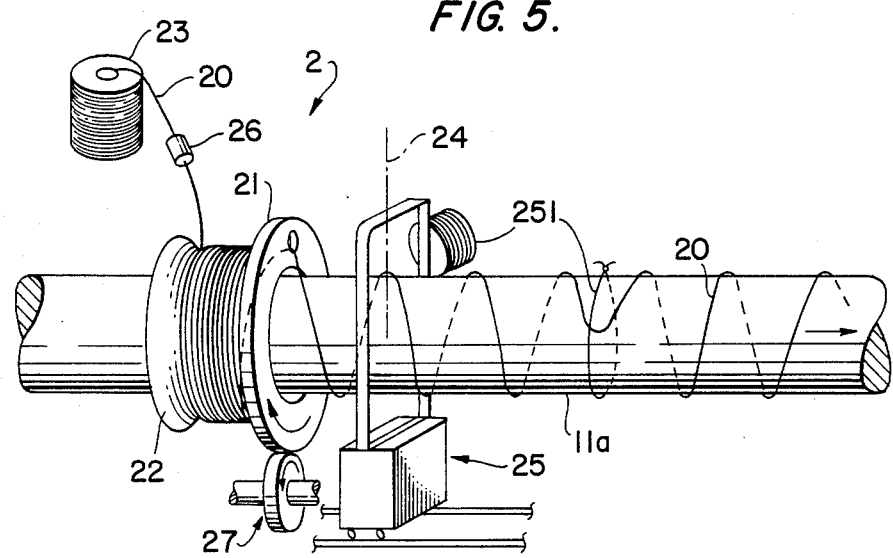
FIG. 5 is a perspective view of the winder.

At the binding position 24, a linear material 251 is wound around the outer peripheral surface of the winding core 11a using a binder 25 (FIG. 5). The linear material 251 used for binding is preferably of equal quality to the weft linear material 20.

After the preliminary stage has abeen finished in the manner described above, the weft linear material 20 is pulled out from a bobbin 23, passed through a suitable guide 26, wound around the winding drum 22 a suitable number of times, passed through the guide holes 211 of the winding disk 21, and fixed at the leading end thereof to a suitable position on the outer peripheral surface of the winding core 11a. Thereafter, the winding disk 21 is rotated in the predetermined direction while the winding core 11a is moved axially in the predetermined direction (for example, to the right in FIG. 3).

When the winding disk 21 is rotated in either direction in the state described above, the linear material 20 is wound on both the winding drum 22 and the winding core 11a. That is, as shown schematically in FIG. 3, the linear material 20 is firstly wound on the winding drum 22, slides thereon, passes through the guide hole 211 of the winding disk 21, and is wound on the winding core 11a. The number of turns of the linear material 20 wound on the winding drum 22 is the same as the number of turns of the linear material wound on the winding core 11a except the number of turns thereof initially wound on the winding drum 22.

The winding pitch of the weft linear material 20 wound on the winding core 11a can be changed by controlling the speed of movement of the winding core 11a or the speed of rotation of the winding disk 21. In this manner, the linear material 20 can be wound on the winding core 11a in a rough pitch and on the winding drum 22 in a tight pitch.

When a predetermined quantity of the weft linear material 20 has been wound on the winding core 11a or on the winding drum 22, the terminal end of the winding on the winding core 11a is bound by another linear material 251 using the binder 25 at the binding position 24 so as to keep the terminal end of the winding from being unwound from the winding core 11a.

After the binding operation, the winding disk 21 is rotated in the direction reverse to that in the preceding occasion. In the first half of the reverse rotation of the winding disk 21, the linear material, while being unwound from the winding on the winding drum 22, is wound on the winding core 11a in the direction reverse to that in the preceding occasion. In the second half of the reverse rotation of the winding disk 21, that is, after the winding of the linear material has been unwound from the winding drum 22, the weft linear material 20, while being wound on the winding drum 22 in the direction reverse to that in the preceding occasion, is continuously wound on the winding core 11a.

When a predetermined quantity of the weft linear material 20 has been wound on the winding core 11a or on the winding drum 22, the binding operation is performed as in the preceding occasion.

The winding operation shown schematically in FIG. 3 is performed by repeating sequentially the steps described above.

The reverse rotation of the winding disk 21 is performed preferably in synchronism with the binding operation. For carrying out the binding operation smoothly, the movement of the winding core 11a may be temporarily stopped during the binding operation or the binding position 24 may be shifted within a predetermined range in time with the speed of movement of the winding core 11a.

In the winding process of the weft linear material 20, as described above, since the weft linear material 20 may slide on the winding drum 22, it is preferred that the winding drum 22 be plated, have attached thereon a low-frictional material, or be provided with idle rollers on the outer surface thereof for smooth sliding of the weft linear material thereon.

As explained with reference to FIG. 4, there are three different types of relations between the winding disk 21 and the winding drum 22. There is no large difference in effect among these structures. In the integral construction of the disk 21 and the drum 22 (FIG. 4A), the winding operation of the weft linear material is carried out smoothly because the winding of the weft linear material is formed from the side opposite to the disk 21. In the construction in which the disk 21 and the drum 22 are relatively rotatable (FIG. 4B), it is possible to apply a brake to the drum 22 during the reverse rotation of the disk 21 to thereby prevent the winding from becoming loose. In the construction in which the winding drum 22 is fixed (FIG. 4C), winding and unwinding of the winding can be carried out relatively smoothly during the reverse rotation because the winding of the weft linear material is formed from the side of the winding disk 21.

By providing the winding disk 21 with a plurality of the guide holes 211, it is possible to wind a plurality of pieces of the weft linear material 20 on the winding core 11a simultaneously.

The winder 2 will now be described with reference to FIG. 5. The construction of FIG. 5 is substantially identical to that of FIG. 3. The synthetic resin feeder 5 described in detail hereinbelow is disposed on the entrance side, on the exit side, or both, of the winder 2. As shown in FIG. 5, the binder 25 is disposed at the binding position 24. The winding disk 21 is rotated alternately in normal and reverse directions with a predetermined period and at a predetermined speed by a driving mechanism 27.

The binder 25 is satisfactory if it has the function to wind the linear material 251 on the outer peripheral surface of the winding core 11a once or twice and bind it. As the binder having such function, a commercially available automatic packing machine may be utilized. Since such automatic packing machine is capable of operating at a high speed requiring only 2–5 seconds for one cycle of operation, it causes no particular hindrance to the binding operation during the ordinary winding operation. In order to achieve secure binding, however, it is preferable to stop the winding core 11a temporarily only during the binding operation or to move the binder 25 over a predetermined distance in synchronism with the winding core 11a.

The actual length of the weft linear material 20 wound helically in the same direction, that is the actual length thereof between the binding linear materials 251, is dependent upon the diameter and the number of pieces of the weft linear materials supplied, the diameter and the speed or rotation of the winding drum, and the diameter and the feed speed of the winding core, but may be set to be in the range from 10 to 15 m at the most. Accordingly, the product according to the present invention can be used as a common sheet molding compound without hindrance. Further, since the cylindrically formed body of the weft linear material is cut open longitudinally by the cutter 6 described in detail hereinbelow at an adequate position, the winding core 11a need not be so long as 10–15 m.

The winding disk 21 and the winding drum 22 may be constructed in any of the relationships shown in FIGS. 4A to 4C, the specific construction of which will be described in detail below.

Figure 6:
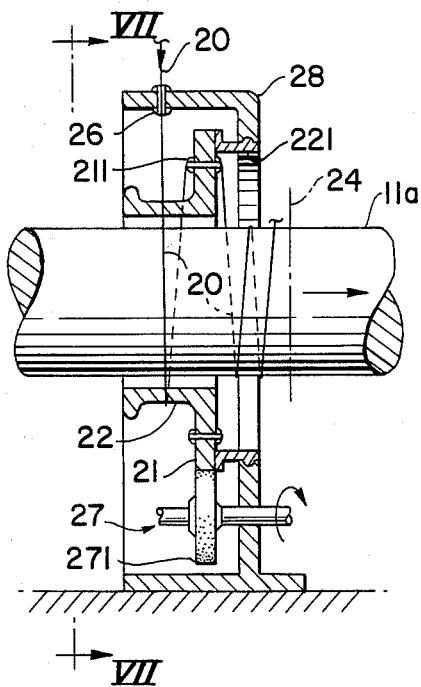
FIG. 6 is a sectional view of an embodiment of the winder according to the present invention.
Figure 7:
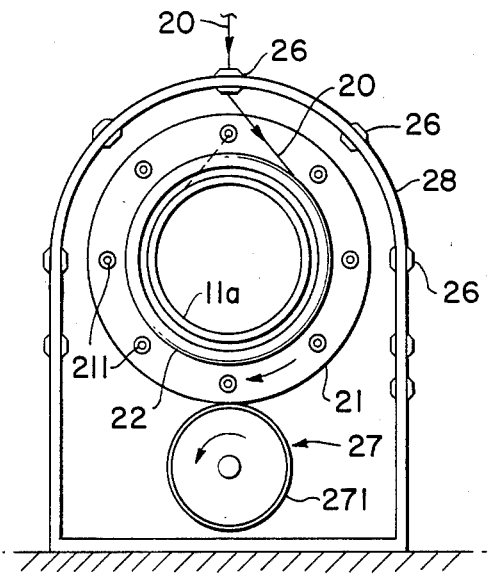
FIG. 7 is an elevation viewed from the line VII—VII of FIG. 6.

The embodiment shown in FIGS. 6 and 7 corresponds to the construction shown in FIG. 4A. That is, the winding disk 21 and the winding drum 22 are formed integrally with each other and supported rotatably with respect to a support frame 28 by a slide ring 221. The winding core 11a is inserted through the central holes of the winding disk 21 and the winding drum 22 and is supported against contact therewith. A disk 271 of the drive mechanism 27 is in frictional contact with the outer peripheral surface of the winding disk 21.

The weft linear material 20 passes through any one of a plurality of the guides 26 provided in the support frame 28, turns around the outer peripheral surface of the winding drum 22, passes through the guide hole 211 provided in the winding disk 21, and has the leading end thereof fixed at to an arbitrary position on the winding core 11a.

The winding operation in this embodiment is the same as that described above in relation to FIG. 3.

Figure 8:
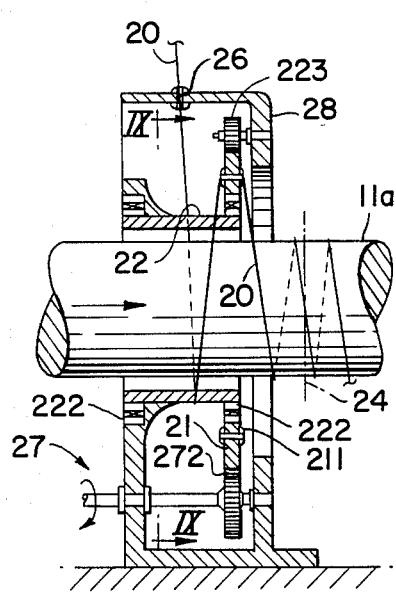
FIG. 8 is a sectional view similar to FIG. 6, showing another embodiment.
Figure 9:
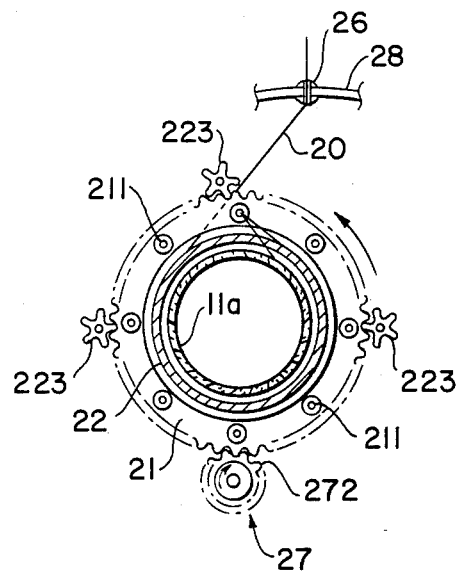
FIG. 9 is an elevation viewed from the line IX—IX of FIG. 8.

The embodiment shown in FIGS. 8 and 9 corresponds to the construction of FIG. 4B. The winding disk 21 and the winding drum 22 are connected relatively rotatably through conventional roller bearings 222. The winding drum 22 is supported rotatably with respect to the support frame 28 through the roller bearings 222. The winding disk 21 is serrated on the outer periphery thereof for engagement with idle gears 223 and a driving gear 272 of the drive mechanism 27. The winding disk 21 is supported by the idle gears 223 rotatably at a predetermined position and is rotatably driven by the driving gear 272.

The embodiment shown in FIG. 10 corresponds to the construction of FIG. 4C. The winding drum 22 is supported fixedly by the support frame 28. The winding disk 21 is connected rotatably with respect to the winding drum 22 through the roller bearings 222. A pulley 225 is fixed to the side of the winding disk 21 and is connected to a driving pulley 273 of the driving mechanism 27 through a belt 274. The winding disk 21 is supported rotatably at a predetermined position by a roller 226 and is rotatably driven by the driving pulley 273.

The system for rotatably driving the winding disk 21 is not specifically limited to the embodiments described above but may be interchanged as required.

In the case where the winding disk 21 and the winding drum 22 are formed integrally, the guide hole 211 may be provided directly at the forward end of the winding drum 22 as shown in FIG. 11, without forming the winding disk 21 specifically. By this construction, the winding angle of the winding on the winding core 11a can be reduced.

The winding sometimes becomes loose during reverse rotation of the winding disk 21. Accordingly, an example of the mechanism for preventing loosening of the winding is shown in FIG. 12. In this mechanism, the winding disk 21 and the winding drum 22 are connected relatively rotatably, and a pair of coil springs 231 are interposed between them so that a reaction force is transmitted to the winding drum 22 through the springs 231 during the reverse rotation of the winding disk 21.

For smooth relative sliding between the winding drum 22 and the winding thereon, it is effective to attach rollers 232 rotatably along the outer peripheral surface of the winding drum 22 as shown in FIG. 13.

A linear material guide mechanism is shown in FIG. 14. A characteristic feature of the present invention resides in that the rotating elements can be made light in weight and small in size, thereby making it possible to wind a number of weft linear materials simultaneously around the winding core 11a. In this case, as shown in FIG. 14, the bobbins 23 having the weft linear materials 20 wound therearound are arranged together at one place and the weft linear materials 20 payed out from the bobbins 23 are directed through respective guide pipes 261 to the respective guides 26 provided in the support frame 28. By this arrangement, it is made possible to make efficient use of the limited space and to guide a number of the weft linear materials surely and without confusion. A similar construction may be applied to guide the warp linear materials.

The warp linear material feeder 3 will now be described with reference to FIGS. 1 and 15. A plurality of the warp linear material bobbins 31 are disposed on the upstream side of and surrounding the flat belt 11. The warp linear materials 30 payed out from the warp linear material bobbins 31 are passed through the warp guide bores 151 of the annular guide 15, respectively, and are guided around and longitudinally of the cylindrically formed winding core 11a. Thereafter, the weft linear materials 20 are wound around the warp linear materials 30 as described hereinabove.

The carrier film feeder 4 comprises a carrier film roll 41 disposed on the upstream side of and above the flat belt 11. A carrier film 40 payed out from the roll 41 is formed into a cylindrical shape together with the flat belt 11 by the hourglass roller 14 and passes through the annular guide 15.

The warp linear materials 30 and the weft linear materials 20 are arranged around the outer peripheral surface of the cylindrically formed portion of the carrier film 40 and the flat belt 11. The carrier film 40 functions to separate the warp linear materials 30 and the weft linear materials 20 from the flat belt 11 and also to keep the layers of the windings from contact with each other when wound in roll by the compound winder 7 as will be described hereinbelow. Before using the sheet molding compound according to the present invention, the carrier film 40 must be separated from the compound.

Figure 15:
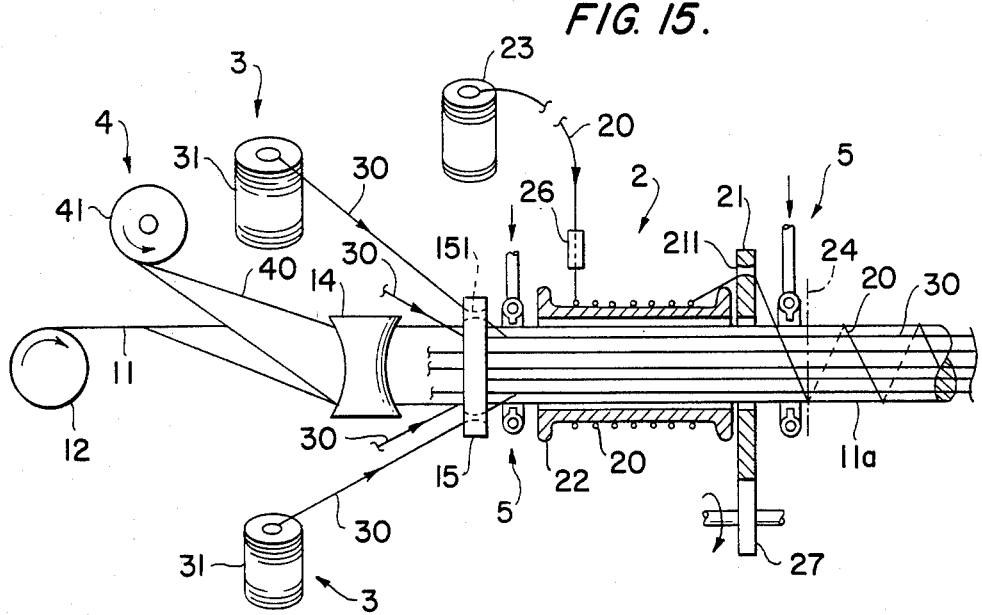
FIG. 15 is an enlarged schematic illustration of the winder of FIG. 1.

As shown in FIG. 15, the synthetic resin feeder 5 is disposed on the entrance side or on the exit side or on both sides of the winder 2 and has a construction to surround the outer peripheral surface of the cylindrically formed body of the warp linear materials 30 or of the warp linear materials 30 and the weft linear materials 20.

Figure 16:
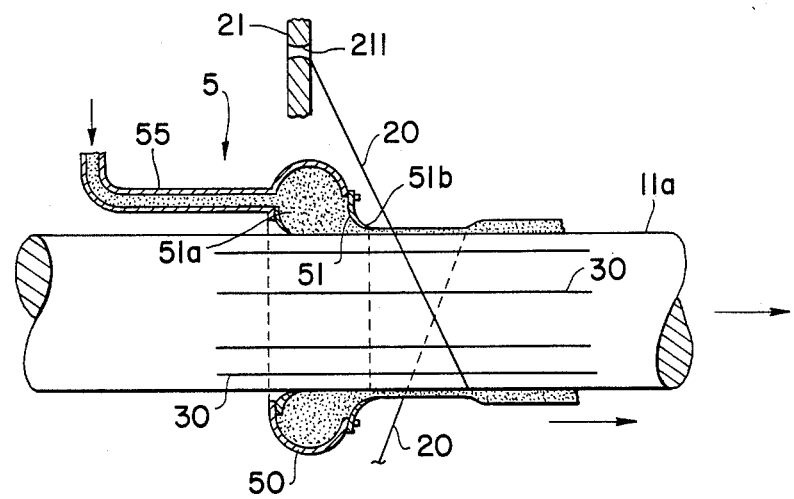
FIGS. 16 to 18 are sectional views of the embodiments of the synthetic resin feeder.

The synthetic resin feeder may have a construction as shown in FIG. 16, in which a hollow annular nozzle 51 has the annular nozzle opening facing along the core 11a with the upstream edge, i.e. the edge toward the direction from which the cylindrically formed body is moving relative to the nozzle, in direct contact with the outer peripheral surface of the core 11a, and the downstream edge 51b spaced slightly from the surface of the core 11a and curved in the downstream direction to supply a layer of a synthetic resin 50 to the core 11a.

Figure 17:
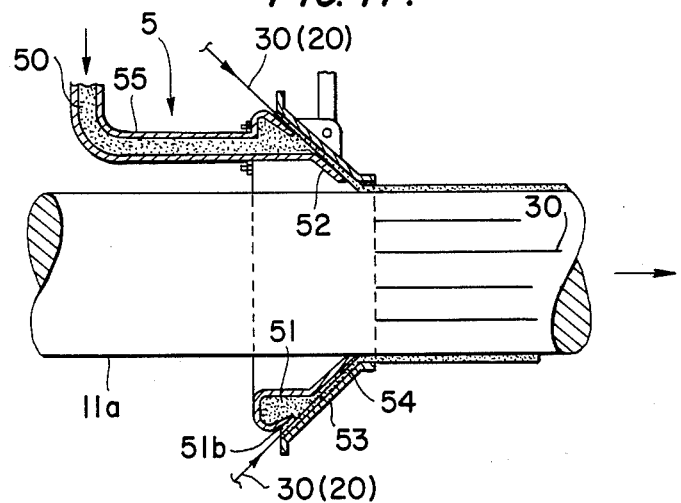

Alternatively it can have a construction as shown in FIG. 17, in which the hollow annular nozzle 51 is spaced from the outer peripheral surface of the core and the warp linear materials 30 or the weft linear materials 20 are guided through the nozzle structure to the core 11a so that the synthetic resin is supplied directly to the linear materials. In the construction shown in FIG. 17, the hollow annular nozzle 51 has the annular opening facing along the core 11a with the outer edge 51b curved slightly inwardly toward the core at an angle to the axis thereof, and the structure has a frustoconical body 52 extending from the inner edge to adjacent the surface of the core 11a and a frustoconical cover 53 having a substantially identical shape extending from the outer edge 51b of the nozzle and parallel and spaced from said body 52 by a predetermined clearance 54 to a point spaced from the outer peripheral surface of the core 11a and then for a short distance parallel to the core. The outer edge 51b is generally parallel to, i.e. at the core angle of the cover 53. In both embodiments, the synthetic resin is supplied to the nozzle 51 through a conduit 55 connected thereto. Apertures are provided between the outer edge 51b and the cover 53 for admitting the linear materials 20 or 30 to the clearance 54 through which the linear materials are led to the core while being covered with the synthetic resin.

Figure 18:
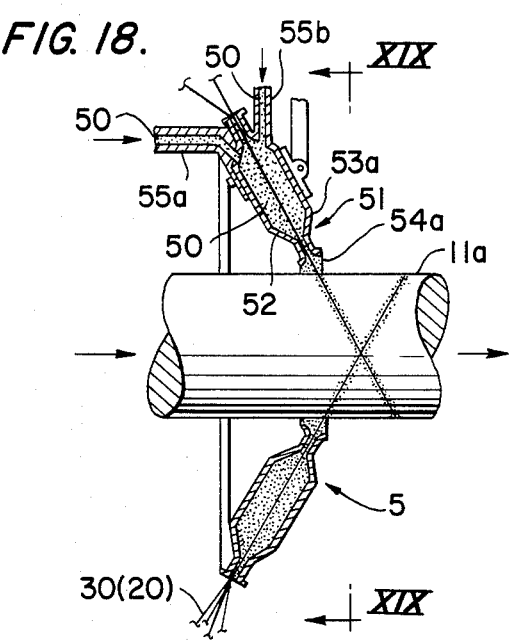
Figure 19:
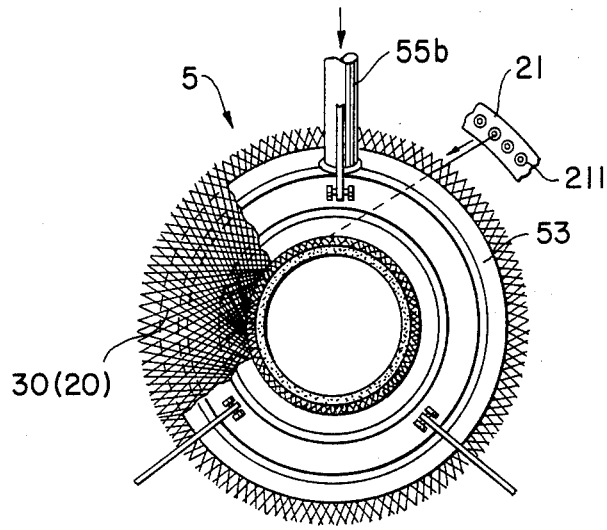
FIG. 19 is a front view seen from the line XIX—XIX of FIG. 18.

FIGS. 18 and 19 show a modified embodiment of the synthetic resin feeder of FIG. 17. In this embodiment, the annular nozzle 51' is defined by generally frustoconical body 52a and generally frustoconical cover 53a in spaced opposed relation to each other and being spaced by a clearance 54a adjacent the outer peripheral surface of the core for defining the outlet of the nozzle directed generally toward the core and spaced slightly therefrom, the body and cover then diverging from each other, extending parallel to each other, and then reconverging to form an aperture at the radially outer part thereof through which linear materials 20 or 30 can be introduced and directed therethrough to the core. A separate conduit 55a and 55b is provided for the body 52a and cover 54a, respectively, so that the supply of resin is facilitated and it is possible to feed and mix different kinds of resin within the space within the nozzle. The synthetic resin is preferably thermoplastic resin. As shown in FIGS. 1 and 2, the cutter 6 is disposed on the downstream side of the flat belt 11 and preferably at the position at which the cylindrically formed portion of the flat belt 11 begins to collapse, that is, at the position at which the edges of the flat belt 11 begin to separate from each other. The cutter 6 is preferably of a rotatable disk the circumferential edge of which constitutes a cutting edge.

The cylindrical body of the warp linear materials 30 and the weft linear materials 20 formed on the winding core 11a is continuously cut open by the cutter 6 longitudinally of the body (almost the weft linear materials 20 are cut) into a belt-like flat sheet molding compound. At this time, the carrier film 40 is mounted on the flat belt 11, and the warp linear materials 30 and the weft linear materials 20 are overlapped in a grid pattern on the carrier film 40.

The compound winder 7 is disposed downstream of the flat belt 11 as shown in FIG. 1 to wind up the sheet molding compound thereabout.

Figure 20A:
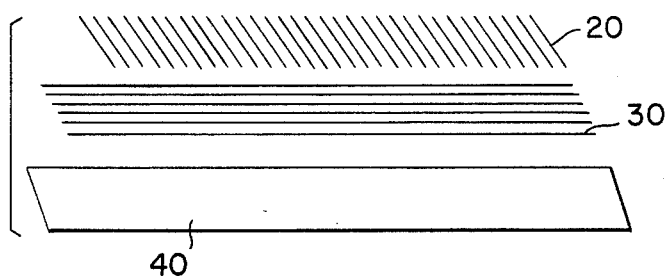
FIGS. 20A to 20D are exploded perspective views of the sheet molding compounds produced in the method according to the present invention.
Figure 20B:
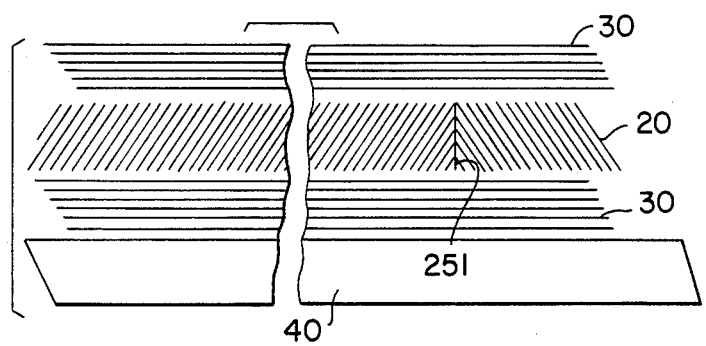
Figure 20C:
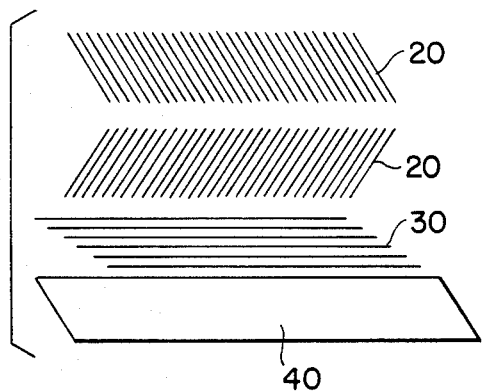
Figure 20D:
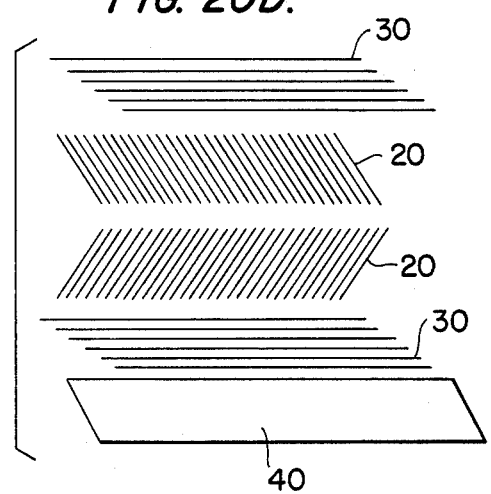
Figure 21A:
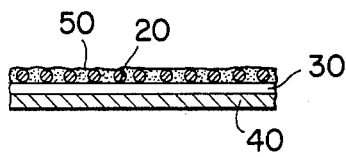
FIGS. 21A to 21D are sectional views of the sheet molding compounds shown in FIGS. 20A to 20D.
Figure 21B:
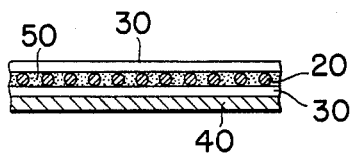
Figure 21C:
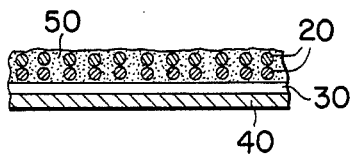
Figure 21D:
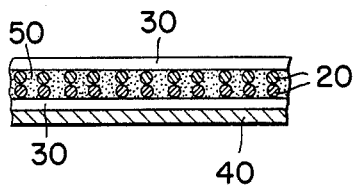
Figure 22A:
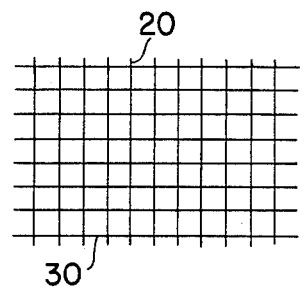
FIGS. 22A to 22C are plan views of the sheet molding compounds shown in FIGS. 20A to 20D.
Figure 22B:
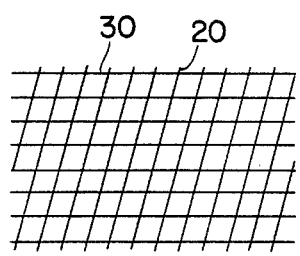
Figure 22C:
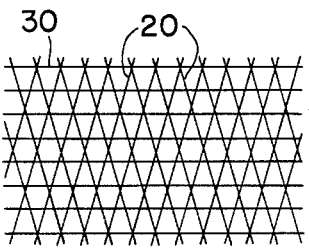
Figure 23:
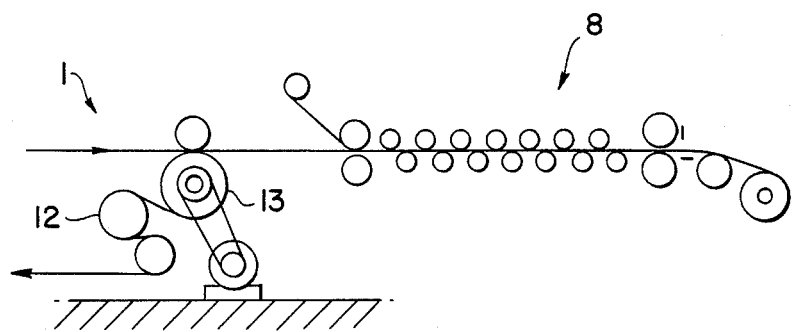
FIG. 23 illustrates a schematic construction of a conventional SMC producing apparatus.

By varying the combination of the winder 2 and the warp linear material feeder 3, various different combinations of the linear materials can be obtained as shown, for example, in FIGS. 20A to 22C, in which FIGS. 20A to 20D are exploded perspective views, FIGS. 21A to 21D are sectional views, and FIGS. 22A to 22C are plan views. In more detail, FIGS. 20A, 21A and 22A correspond to each other in that a layer of the weft linear materials 20 are superposed on a layer of the warp linear materials 30; FIGS. 20B, 21B and 22B correspond to each other in that a layer of the weft linear materials 20 are interposed between two layers of the warp linear materials; FIGS. 20C, 21C and 22C correspond to each other in that two layers of the weft linear materials 20 are superposed on a layer of the warp linear materials 30; and FIGS. 20D and 21D correspond to each other in that two layers of the weft linear materials 20 are interposed between two layers of the warp linear materials 30.

In the cylindrically formed body, as described hereinabove, since the same piece of the weft linear material 20 is oriented in the same direction between the binding linear materials 251 and since the cylindrical body can be so formed that the length of the weft linear material thereof is in the range of 10-20 m, the troubles such as different orientation of the weft linear material and local bulging in the binding linear material position are eliminated by cutting the sheet molding compound in the vicinity of the binding linear materials 251.

The sheet molding compound formed in the method or by the apparatus according to the present invention may, as described hereinabove, be wound by the winder 7 for carriage to the other apparatus for use or may be carried directly to a common SMC producing apparatus 8.

According to the present invention, mechanical strength of the compound is considerably increased because the linear materials are not woven, and production cost is reduced by approximately 40% as compared with the conventional method by the improvement in the winding step.

INDUSTRIAL APPLICABILITY

The method and the apparatus according to the present invention achieve the most noticeable effects when applied particularly to a continuous production line of reinforced synthetic resin articles.

I claim:

1. An apparatus for producing a sheet molding compound, comprising:
    a belt circulator for circulating a flat belt while curving said flat belt in a cylindrical form along a predetermined path and guiding it;
    a carrier film roll disposed adjacent said belt circulator for supplying a carrier film to said cylindrically formed portion;
    a warp material bobbin disposed adjacent said belt circulator and having a linear warp material wound therearound and being for supplying the warp material to said cylindrically formed portion;
    a winding disk supported coaxially and relatively movably along said cylindrically formed portion of said flat belt and having at least one guide hole therein;
    a driving mechanism connected to said winding disk for rotating said winding disk alternately in opposite directions at a predetermined period and at a predetermined speed;
    a winding drum disposed upstream of and adjacent to said winding disk with respect to the direction of movement of said flat belt and supported coaxially and relatively movably along said cylindrically formed portion;
    a weft material bobbin disposed adjacent said belt circulator and having a linear weft material wound therearound and being for feeding said weft material to said winding drum;
    a binder disposed downstream of and adjacent to said winding disk with respect to the direction of movement of said flat belt for binding the outer periphery of the cylindrically formed portion with other linear material at a predetermined period;
    a cutter disposed at the downstream end of said cylindrically formed portion for continuously cutting said weft material; and
    an improved synthetic resin feeder disposed upstream or downstream of said winding disk for supplying synthetic resin to the warp or weft material and comprising a hollow annular nozzle, means for supplying synthetic resin into said nozzle, said nozzle having an annular nozzle opening facing along the cylindrically formed portion and having an upstream edge with substantially the same inside diameter as the outside diameter of the material wound on the cylindrically formed portion for being in contact with the outer peripheral surface of the cylindrically formed portion during use, and having a downstream edge with an inside diameter slightly larger than the outside diameter of the cylindrically formed portion for being spaced slightly from the surface of the cylindrically formed portion and curved in the downstream direction for supplying a layer of resin from the nozzle onto the cylindrically formed portion.

2. An apparatus for producing a sheet molding compound, comprising:
    a belt circulator for circulating a flat belt while curving said flat belt in a cylindrical form along a predetermined path and guiding it;
    a carrier film roll disposed adjacent said belt circulator for supplying a carrier film to said cylindrically formed portion;
    a warp material bobbin disposed adjacent said belt circulator and having a linear warp material wound therearound and being for supplying the warp material to said cylindrically formed portion;
    a winding disk supported coaxially and relatively movably along said cylindrically formed portion of said flat belt and having at least one guide hole therein;
    a driving mechanism connected to said winding disk for rotating said winding disk alternately in opposite directions at a predetermined period and at a predetermined speed;
    a winding drum disposed upstream of and adjacent to said winding disk with respect to the direction of movement of said flat belt and supported coaxially and relatively movably along said cylindrically formed portion;
    a weft material bobbin disposed adjacent said belt circulator and having a linear weft material wound therearound and being for feeding said weft material to said winding drum;
    a binder disposed downstream of and adjacent to said winding disk with respect to the direction of movement of said flat belt for binding the outer periphery of the cylindrically formed portion with other linear material at a predetermined period;
    a cutter disposed at the downstream end of said cylindrically formed portion for continuously cutting said weft material; and
    an improved synthetic resin feeder disposed upstream or downstream of said winding disk for supplying synthetic resin to the warp or weft material and comprising a hollow annular nozzle, means for supplying a synthetic resin into said nozzle, said nozzle having an inside diameter greater than the outside diameter of the cylindrically formed portion for being spaced from the cylindrically formed portion, said nozzle having an annular opening facing along the cylindrically formed portion, a frustoconical body extending from the inner edge of said nozzle opening toward the cylindrically formed portion and having an inside diameter slightly larger than the outside diameter of the cylindrically formed portion for being spaced slightly from the cylindrically formed portion, and a frustoconical cover having substantially the same shape as said frustoconical body and extending from the outer edge of said nozzle opening to adjacent the cylindrically formed portion and having an inside diameter slightly larger than the outer diameter of the cylindrically formed portion for being spaced slightly therefrom, said frustoconical cover being spaced from said frustoconical body by a predetermined clearance, the outer peripheral portion of said cover and the outer edge of said nozzle opening having apertures therebetween for admitting linear materials to be wound around the cylindrically formed portion for passage through said clearance where they are covered by a synthetic resin from the nozzle.

3. A nozzle structure as claimed in claim 2 in which said cover has a cylindrical portion on the inner periphery thereof extending parallel to the cylindrically formed portion.

4. A nozzle structure as claimed in claim 2 in which the outer edge of said nozzle opening is curved slightly inwardly at an angle substantially parallel to the conical angle of said cover.

5. An apparatus for producing a sheet molding compound, comprising:
- a belt circulator for circulating a flat belt while curving said flat belt in a cylindrical form along a predetermined path and guiding it;
- a carrier film roll disposed adjacent said belt circulator for supplying a carrier film to said cylindrically formed portion;
- a warp material bobbin disposed adjacent said belt circulator and having a linear warp material wound therearound and being for supplying the warp material to said cylindrically formed portion;
- a winding disk supported coaxially and relatively movably along said cylindrically formed portion of said flat belt and having at least one guide hole therein;
- a driving mechanism connected to said winding disk for rotating said winding disk alternately in opposite directions at a predetermined period and at a predetermined speed;
- a winding drum disposed upstream of and adjacent to said winding disk with respect to the direction of movement of said flat belt and supported coaxially and relatively movably along said cylindrically formed portion;
- a weft material bobbin disposed adjacent said belt circulator and having a linear weft material wound therearound and being for feeding said weft material to said winding drum;
- a binder disposed downstream of and adjacent to said winding disk with respect to the direction of movement of said flat belt for binding the outer periphery of the cylindrically formed portion with other linear material at a predetermined period;
- a cutter disposed at the downstream end of said cylindrically formed portion for continuously cutting said weft material; and
- an improved synthetic resin feeder disposed upstream or downstream of said winding disk for supplying synthetic resin to the warp or weft material and comprising a generally frustoconical body and a generally frustoconical cover in spaced opposed relation to each other, means for sypplying a synethetic resin through each of said body and said cover, the inner diameter of said nozzle structure being slightly larger than the outside diameter of the cylindrically formed portion, the inner ends of said body and said cover being spaced by clearance for defining the outlet of the nozzle directed generally toward and at the angle of the frustoconical body and cover toward the cylindrically formed portion, said body and cover diverging from each other in the outward direction from said outlet and then reconverging and having the outer peripheral edges thereof spaced from each other for forming an aperture for admitting linear materials to be wound around the cylindrically formed portion for passage through said nozzle where they are covered by synthetic resin.

* * * * *